3,473,949
METHOD OF FORMING ACRYLIC RESIN SURFACE COATINGS
Roger J. Eldred, Warren, and Tzu Jen Mao, Royal Oak, Mich., assignors to General Motors Corporation, Detroit, Mich., a corporation of Delaware
No Drawing. Filed May 9, 1966, Ser. No. 548,430
Int. Cl. B44d 1/44, 1/46
U.S. Cl. 117—62.2           5 Claims

ABSTRACT OF THE DISCLOSURE

A method of forming a thin, protective, decorative acrylic resin coating is disclosed. A base coat solution containing N,N-dimethyl-p-toluidine and a high boiling vehicle is sprayed onto the substrate to form a base coat thereon. An outer coating solution containing an acrylic monomer having a glycidyl grouping therein, such as glycidyl methacrylate, and an organic peroxide catalyst, such as benzoyl peroxide, is applied on top of the base coat. Within ten minutes the outer coating has polymerized to the extent that it is hard enough to permit handling. The coated substrate is then placed in an oven at an elevated temperature in order to complete the polymerization and form a thin hard wear-resistant decorative acrylic resin coating.

---

This invention relates to a method of forming protective and decorative surface coatings and more particularly to a method for polymerizing an acrylic monomer having a glycidyl group therein in situ.

The conventional process for painting automobile bodies in the automotive industry where acrylic paint is used is to spray an acrylic resin solution which contains approximately 20% polymers, plasticizer, and pigment and 80% solvent such as acetone, methyl ethyl ketone, ethylene glycol monoethyl ether acetate, and others onto a steel panel of an automobile body which has a primer coating thereon. After the acrylic solution has been sprayed on, it is baked at a temperature ranging from 285° to 300° F. for a period of time ranging from 30 minutes to 45 minutes. As is readily apparent, only 20% of the solution contains material which will provide the decorative surface coating on the substrate. Conversely, 80% of the solution is lost thereby increasing the cost of this process considerably.

The formation of a hard, wear-resistant protective and decorative surface coating by the thermal polymerization of an acrylic monomer may be done at temperatures ranging up to 175° F. depending upon the relative volatility of acrylic monomer used and the catalyst system used. However, polymerization at temperatures below 175° F. has not been practical in view of the excessive time required, that is, the time is much too long for commercial application. This is particularly true in polymerizations which are attempted at room temperature. Another disadvantage is the discoloring of the surface coating by the accelerator and/or the catalyst, that is, the catalyst system either imparts its own color to the coating or it changes the color of the pigment used in the coating. Still another disadvantage with room temperature polymerizations is the necessity of applying a thick acrylic monomer coating to the substrate in order for the bulk heat effect, caused by the reaction between the accelerator and the catalyst, to take place which is necessary for the polymerization. For example, it is necessary to apply an acrylic monomer coating 10 mils thick in order for the accelerator and the catalyst to be effective at room temperature, in contrast to the normal paint thickness on an automobile body of 2 to 3 mils thick.

It is a principal object of this invention to provide a process whereby a thin decorative acrylic resin coating on a substrate is polymerized sufficiently at room temperature in situ to permit handling thereof. It is another object of this invention to provide a process whereby N,N-dimethyl-p-toluidine and an organic peroxide catalyst are used to form a thin, wear-resistant, decorative acrylic resin coating without discoloring the surface coating.

These and other objects are accomplished by preferably spraying the substrate with a base coat containing an amine accelerator such as N,N-dimethyl-p-toluidine in a high boiling vehicle. On top of this base coat an outer coating containing an acrylic monomer having a glycidyl grouping therein and an organic peroxide catalyst such as benzoyl peroxide is applied. The amine accelerator in the base coat causes the organic peroxide in the outer coating to form free radicals which in turn catalyze the polymerization of the acrylic monomer in the outer coating. The acrylic monomer is partially polymerized to the extent that the outer coating is dry to the touch; that is, the coating can be handled without affecting the surface. The article is then subjected to an elevated temperature in the range of 300° F. for a time of about 10 minutes in order to complete the polymerization and form a thin, hard, wear-resistant decorative acrylic resin coating. In a preferred embodiment of the invention, the outer coating solution may also contain an acrylic polymer, an acrylic monomer not having a glycidyl grouping therein, a pigment and a plasticizer.

Further objects and advantages of the present invention will be apparent from the following detailed description, reference being had to the following examples wherein the preferred embodiments of the present invention are clearly shown.

In general, in the method of the present invention, the steel panel is first conditioned and has a primer coating secured thereon in the manner prepared in the conventional process mentioned above. The primer coating is not essential in the practice of this invention, but is used in preferred embodiments. In the next step of the process, a sprayable high boiling carrier such as Cellosolve acetate is mixed with an amine accelerator, N,N-dimethyl-p-toluidine. Then the solution is preferably sprayed onto the primed steel substrate in a manner similar to spray painting to form a base coating; although the solution could be applied by brushing it on or by dipping the panel into the solution. The mixing and spraying step may be done concurrently by using a double nozzle spray gun. In the next step of the process, a sprayable glycidyl methacrylate solution is mixed with an organic peroxide catalyst. The glycidyl methacrylate solution is then, preferably, sprayed on top of the base coat previously referred to in a manner similar to spray painting. As indicated above, the mixing and the spraying steps may be done concurrently by using a double nozzle spray gun. In about 10 minutes the glycidyl methacrylate coating has partially polymerized to the extent that the outer surface is dry to the touch. The panel may be picked up with care at this point without making an imprint or finger print on the outer surface thereof. The panel is placed in an oven and baked for 10 minutes at 300° F. in order to complete the polymerization and form a thin, hard, wear-resistant, decorative acrylic coating. As will be hereinafter fully described, the glycidyl methacrylate coating solution may contain other acrylic monomers, preformed polymers, plasticizers, and pigments, which combine with the glycidyl methacrylate and providing a superior decorative coating. As will be hereinafter fully described, the base coat coating solution may contain pigment, resin, acrylic monomers, and/or high boiling solvents. One advantage of the process of this invention is that substantially all of the initial coating composition is present in the final coating instead of only about 20% as the conventional process has. Another important advantage is that a thin acrylic coating 1 to 3 mils thick may be polymerized sufficiently at room temperature to permit handling thereof. In addition, this invention produces a coating which is fully cured in a relatively short time, approximately 20 minutes or less. This invention also produces a decorative coating in which the color has not been adversely affected by the catalyst system.

The base coat coating solution contains an initiator which will react with an organic peroxide. Although a number of amine accelerators such as N,N-dimethylaniline, N,N-diethylaniline, N,N-dimethyl-p-toluidine, N,N-dimethyl - o - toluidine, N,N-diethyl-2,4-dimethylaniline, and N,N-dimethyl-m-toludine are known to accelerate the decomposition of organic peroxides such such as benzoyl peroxide, for reasons we are unable to explain, the only amine accelerator that will work in the practice of this invention is N,N-dimethyl-p-toluidine. The N,N-dimethyl-p-toluidine in the base coat on the substrate will migrate to the surface of the ground coating and diffuse into the outer acrylic monomer coating to decompose the benzoyl peroxide into peroxide free radicals. The concentration of the N,N-dimethyl-p-toluidine in the base coat should be 4 weight percent or higher. Numereous high boiling solvents may be used as a carrier for the N,N-dimethyl-p-toluidine in the base coat coating solution. Examples of high boiling carriers or vehcles for the amine accelerator include Celloslove acetate and high boiling acrylic monomers such as glycidyl methacrylate, butyl methacrylate and hexyl methacrylate. The base coat coating solution may contain a mixture of solvents such as are found in commercially available lacquer thinners which are a mixture of alcohol, acetone, Cellosolve acetate and high boiling solvents. The base coat coating solution may contain in addition to a solvent and N,N-dimethyl-p-toluidine, resins and pigments which combine with glycidyl methacrylate outer coating solution materials in providing a superior decorative coating. Glycidyl methacrylate and ethylene glycol monoethyl ether acetate are the preferred accelerator carriers for the base coating.

The essential acrylic monomer in the outer coating solution must contain a glycidyl grouping therein, such as found in glycidyl methacrylate and glycidyl acrylate. The preferred monomer is glycidyl methacrylate. Glycidyl methacrylate is very reactive and it has a relatively low vapor pressure when compared with other acrylic monomers. The high reactivtity of the glycidyl methacrylate is important since it is difficult to polymerize any acrylic monomer which forms a hard, protective coating at room temperature even in the presence of a catalyst and an accelerator. The maximum concentration of the glycidyl methacrylate is 95 weight percent, the balance being the catalyst. The preferred glycidyl methacrylate concentration in the coating solution is between 25 to 75 weight percent.

The outer coating solution contains a free radical-type catalyst for the polymerization of the ethylenically unsaturated portion of the glycidyl methacrylate. The free radical-type catalysts preferred in this reaction are the organic peroxides such as benzoyl peroxide, cyclohexanone peroxide, t-butyl peracetate, t-butyl perbenzoate, acetyl peroxide, decanoyl peroxide, propionyl peroxide, dichlorobenzoyl peroxide. All of these peroxides are well known to be the free radical-type catlaysts which are commonly used to polymerize ethylenically unsaturated acrylic monomers. The free radical-type catalysts preferred are benzoyl peroxide, decanoyl peroxide, and cyclohexanone peroxide. The concentration of the organic peroxide catalyst may vary from 1 to 8 weight percent.

Other components of the outer coat coating solution which are added to improve the properties or lower the cost of the final surface coating are preformed polymers, plasticizers, paint pigments and acrylic monomers not having the glycidyl group therein. Preformed polymers reduce the cost of the coating, improve the physical properties of the coating and also impart the desired viscosity to the coating solution. Polymers which are preferred in this coating solution are polymethyl methacrylate, cellulose acetate-butyrate and methyl methacrylate-butyl methacrylate copolymer. Other polymers which may be used are those of ethyl methacrylate, n-butyl methacrylate, isobutyl methacrylate, n-butyl isobutyl methacrylate copolymer, and silicon resin as well as other methacrylate resins. The concentration of the polymer may vary from 0 to 50 weight percent. Plasticizers are conventionally added to acrylic resin formulations to make the resin less brittle. The preferred plasticizers are butyl benzyl phthalate and octyl-benzyl phthalate. Other plasticizers are butyl-decyl phthalate, butyl-octyl phthalate, dibutyl phthalate, dihexyl phthalate, dicyclohexyl phthalate, diethyl phthalate, dimethyl phthalate, ditridecyl phthalate, diphenyl phthalate, dioctyl phthalate, and diisooctyl phthalate. The concentration of the plasticizer may vary from 0 to 20 weight percent. Pigments which are added to color the decorative surface coating may either be inorganic or organic, such as titanium dioxide, iron oxide, the phthalocyanines, aluminum flake and the like. The concentration of the pigment may range from 0 to 35 weight percent. Acrylic monomers not having a glycidyl grouping therein which may be used in the practice of this invention in the outer coating are butyl methacrylate, hexyl methacrylate, octyl methacrylate, lauryl methacrylate, 2-ethyl-hexylacrylate, and any other low cost acrylic monomer. The concentration of the acrylic monomer not having a glycidyl grouping therein may vary from 0 to 40 weight percent.

The following examples are given to illustrate the invention but are not to be considered as limiting the invention thereto.

Example No. 1

A homogeneous solution containing 20 grams of N.N-dimethyl-p-toluidine and 20 grams ethylene glycol monoethyl ether acetate was sprayed onto a primed steel panel to form a thin base coating thereon. Then an outer coating solution containing 52 weight percent glycidyl methacrylate, 23 weight percent methyl methacrylate-butyl methacrylate copolymer, 20 weight percent titanium dioxide pigment, 4 weight percent octyl-benzyl phthalate and 1 weight percent benzoyl peroxide was sprayed onto the base coating to form a thin, outer coating thereon. The panel was allowed to stand at room temperature for 10 minutes. At the end of 10 minutes the outer coating was dry to the touch. The coated steel panel was then placed in an oven having a temperature of 325° F. for a 5 minute bake. After the panel had cooled, the thin decorative coating was extremely hard, wear-resistant and had a high initial gloss. The yield was greater than 90%.

Example No. 2

A homogeneous solution containing 5 grams of N,N-dimethyl-p-toluidine, 15 grams ethylene glycol monoethyl ether acetate and 80 grams of Du Pont 881–1988 sealer, a proprietary solution containing an acrylic resin, aromatic aliphatic solvent mixture and an inorganic pigment, was sprayed onto a primed steel panel to form a base coat thereon. The base coat was allowed to dry for 3 minutes. Then an outer coating solution containing 49 weight percent glycidyl methacrylate, 14 weight percent of a methyl methacrylate-butyl methacrylate copolymer, 28% titanium dioxide pigment, 7 percent sucrose acetate isobutyrate, and 2% benzoyl peroxide was sprayed onto the base coating to form a thin coating thereon. The coating was allowed to stand at room temperature for 10 minutes, at which time it was dry to the touch. The coated steel panel was then placed in an oven having a temperature of 300° F. for 10 minutes. The coated steel panel was then removed from the oven and upon cooling had a thin, wear-resistant decorative coating. The yield was 95 weight percent.

Example No. 3

A homogeneous solution containing 25 grams of N,N-dimethyl-p-toluidine and 75 grams of acrylic lacquer thinner No. 3589, a proprietary composition containing ethylene glycol monoethyl ether acetate, high boiling aromatic and aliphatic solvents, alcohol and acetone, was sprayed onto a primed steel panel to form a thin base coating thereon. An outer coating solution containing 53 weight percent glycidyl methacrylate, 14% methyl methacrylate-butyl methacrylate copolymer, 30% titanium dioxide pigment, 1% silicon paint additive-Dow Corning No. 6, and 2 weight percent benzoyl peroxide was sprayed onto the base coating to form an outer coating thereon. After standing at room temperature for 10 minutes the primed steel panel was heated in a 300° F. oven for 10 minutes. The resultant steel panel had a thin, hard, wear-resistant, high gloss decorative coating thereon. The yield was 94 weight percent.

Example No. 4

A homogeneous solution containing 20 grams of N,N-dimethyl-p-toluidine and 20 grams of glycidyl methacrylate was sprayed onto a primed steel panel to form a base coating thereon. An outer solution containing 30.1 weight percent glycidyl methacrylate, 9 weight percent octyl-benzyl phthalate, 27.2 weight percent methyl methacrylate-butyl methacrylate copolymer, 27.2 weight percent titanium dioxide and 6.5 weight percent benzoyl peroxide was sprayed onto the base coating to form a thin outer coating thereon. The panel was allowed to stand at room temperature for 7 minutes in order to form a coating which was dry to the touch. The coated panel was then baked for 5 minutes at 325° to yield a thin, wear-resistant, decorative, acrylic resin coating thereon. The yield was greater than 90 weight percent.

The examples given above show that N,N-dimethyl-p-toluidine may be used over a broad concentration range and that various organic high boiling solvents may be used successfully in forming a thin, hard, wear-resistant, decorative acrylic resin coating. These examples illustrate that this invention produces a thin, hard, wear-resistant decorative coating in a short time; that is, 15 to 20 minutes total time at room temperature and at an elevated temperature with the yield exceeding 90 weight percent.

While the invention has been described in terms of specific examples, it is to be understood that it is not limited thereby except as defined in the following claims.

We claim:
1. A method of forming a thin, protective, decorative acrylic resin coating on a steel substrate in situ which comprises the steps of applying a base coat solution containing at least 4 weight percent N,N-dimethyl-p-toluidine and a high boiling organic vehicle on said substrate to form a base coat thereon, applying an outer coat solution containing an acrylic monomer having a glycidyl grouping therein and an organic peroxide catalyst over said base coat to form an outer coating thereon, said N,N-dimethyl-p-toluidine diffusing into said outer coating to react with said peroxide catalyst, said peroxide catalyst rapidly polymerizing said acrylic monomer partially so that said outer coating is dry to the touch.

2. A method as described in claim 1 wherein said acrylic monomer having a glycidyl grouping therein is glycidyl methacrylate.

3. A method as described in claim 1 wherein said outer coating solution contains 5 to 95 parts by weight glycidyl methacrylate, 1 to 8 parts by weight organic peroxide, 0 to 35 weight percent pigment, 0 to 20 parts by weight plasticizer, 0 to 40 parts by weight acrylic monomer not having a glycidyl grouping therein, and 0 to 50% polymer.

4. A method as described in claim 1 wherein said outer coating is baked, said baking step completing the polymerization of said acrylic monomer to form a thin, hard, decorative, protective coating.

5. A method as described in claim 1 wherein said high boiling material is taken from the group consisting of ethylene glycol monoethyl ether acetate, glycidyl methacrylate, butyl methacrylate and hexyl methacrylate.

References Cited

UNITED STATES PATENTS

| | | | |
|---|---|---|---|
| 2,684,305 | 7/1954 | Quinlivan | 117—62.2 X |
| 2,823,140 | 2/1958 | Lowell. | |
| 2,868,760 | 1/1959 | Staicopoulos | 117—161 X |
| 2,934,509 | 4/1960 | Crissey et al. | 117—123 X |
| 3,052,659 | 9/1962 | Woodruff | 117—132 X |

FOREIGN PATENTS 698,689   11/1964   Canada.

WILLIAM D. MARTIN, Primary Examiner

M. LUSIGNAN, Assistant Examiner

U.S. Cl. X.R.

117—119.6, 132